(12) United States Patent
Paulus

(10) Patent No.: US 10,804,832 B2
(45) Date of Patent: Oct. 13, 2020

(54) CONTROL SYSTEM FOR A SYNCHRONOUS MACHINE AND METHOD FOR OPERATING A SYNCHRONOUS MACHINE

(71) Applicant: Robert Bosch GmbH, Stuttgart (DE)

(72) Inventor: Sebastian Paulus, Esslingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/344,071

(22) PCT Filed: Oct. 4, 2017

(86) PCT No.: PCT/EP2017/075130
§ 371 (c)(1),
(2) Date: Apr. 23, 2019

(87) PCT Pub. No.: WO2018/077579
PCT Pub. Date: May 3, 2018

(65) Prior Publication Data
US 2019/0334464 A1    Oct. 31, 2019

(30) Foreign Application Priority Data
Oct. 24, 2016   (DE) .................. 10 2016 220 891

(51) Int. Cl.
*H02P 21/18* (2016.01)

(52) U.S. Cl.
CPC .......... *H02P 21/18* (2016.02); *H02P 2203/11* (2013.01)

(58) Field of Classification Search
CPC ...................................................... H02P 21/18

USPC ....................................................... 318/400.02
See application file for complete search history.

(56) References Cited

U.S. PATENT DOCUMENTS

| | | | | |
|---|---|---|---|---|
| 2010/0295403 A1* | 11/2010 | Morita | ............... | H02K 1/146 310/156.78 |
| 2011/0199031 A1* | 8/2011 | Balazovic | ............... | H02P 23/14 318/400.33 |
| 2014/0327379 A1* | 11/2014 | Yang | ............... | H02P 6/18 318/400.02 |

(Continued)

FOREIGN PATENT DOCUMENTS

| | | |
|---|---|---|
| DE | 102010053098 | 6/2012 |
| DE | 102013204194 | 9/2014 |

OTHER PUBLICATIONS

International Search Report for Application No. PCT/EP2017/075130 dated Jan. 23, 2018 (English Translation, 3 pages).

(Continued)

*Primary Examiner* — Kawing Chan
(74) *Attorney, Agent, or Firm* — Michael Best & Friedrich LLP

(57) ABSTRACT

The invention relates to a control system and to a method for operating a synchronous machine. In particular, the synchronous machine is controlled on the basis of a rotor angle that was determined by means of a sensorless rotor-angle detection method. In order to check the reliability of the rotor angle determined without sensors, the difference value between the rotor inductances in the q direction and in the d direction is monitored. If said difference value falls below a limit value, this indicates possible instabilities in the determination of the rotor angle.

6 Claims, 2 Drawing Sheets

(56) References Cited

U.S. PATENT DOCUMENTS

2015/0357956 A1* 12/2015 Shimada ................ H02P 6/181
  318/400.02
2016/0028337 A1* 1/2016 Goetting ................ H02P 6/185
  318/400.02

OTHER PUBLICATIONS

Bianchi et al., "Effect of stator and rotor saturation on sensorless rotor position detection," Energy Conversion Congress and Exposition (ECCE), 2011 IEEE, Sep. 17, 2011, pp. 1528-1535.

Linke et al., "Sensorless position control of permanent magnet synchronous machines without limitation at zero speed," EICOn-2002, Proceedings of the 28th Annual Conference of the IEEE Industrial Electronics Society, Sevilla, Spain, Nov. 5-8, 2002, IEEE, New York, NY, vol. 1, Nov. 5, 2002, pp. 674-679.

* cited by examiner

CONTROL SYSTEM FOR A SYNCHRONOUS MACHINE AND METHOD FOR OPERATING A SYNCHRONOUS MACHINE

BACKGROUND OF THE INVENTION

The present invention relates to a control system for a synchronous machine and to a method for operating a synchronous machine.

Electrical machines, in particular synchronous machines, are of significant importance in the development of drive concepts for electric and hybrid vehicles. In order to provide a required torque for a synchronous machine, a rotating magnetic field, which rotates synchronously with the rotor, is generated in the stator of the machine. To control the synchronous machine and to generate the magnetic field, the current angle of the rotor is required. The current rotor angle may in this case be determined by way of an additional angle sensor or by way of a sensor-free angle determination method.

Document DE 10 2013 204 194 A1 discloses a method for operating a synchronous machine. In this case, an operating point trajectory of the synchronous machine is set such that a difference between d-axis and q-axis inductance of the synchronous machine in the coordinate system fixed to the rotor is as high as possible. The operating point trajectory of the synchronous machine is defined using a characteristic diagram, which needs to be determined beforehand, for all possible two-tuples of useful energization values in the coordinate system fixed to the rotor, in which the amplitude of the system responses are plotted as isobars.

SUMMARY OF THE INVENTION

The present invention provides a method for operating a synchronous machine and a control system for a synchronous machine.

Accordingly, there is provided:

A method for operating a synchronous machine having a step for determining a rotor angle of the synchronous machine. The rotor angle of the synchronous machine is in this case determined by way of sensor-free rotor angle detection. The method furthermore comprises a step for determining a difference value between a rotor inductance of the synchronous machine in the pole axis direction (d-axis) and a rotor inductance of the synchronous machine in the pole gap direction (q-axis) in a coordinate system, fixed to the rotor, of the synchronous machine. The method furthermore comprises a step for discarding the determined rotor angle if the amplitude of the difference between the rotor inductance of the synchronous machine in the pole axis direction and the rotor inductance of the synchronous machine in the pole gap direction lies below a predefined threshold value. The method furthermore comprises a step for driving the synchronous machine using the determined rotor angle if the amplitude of the difference between the rotor inductance of the synchronous machine in the pole axis direction and the rotor inductance of the synchronous machine in the pole gap direction does not lie below the predefined threshold value.

There is further provided:

A control system for a synchronous machine having a control apparatus that is designed to perform field-oriented control of the synchronous machine according to the method according to the invention for operating the synchronous machine.

Sensor-free rotor angle determination methods may require a significant difference between the rotor inductance in the pole axis direction and the rotor inductance in the pole gap direction as a necessary property. In this case, the present invention is based on the knowledge that this necessary property fades away with an increasing phase current of the synchronous machine. If the amplitude of the difference between the rotor inductance in the pole axis direction and the rotor inductance in the pole gap direction decreases, then sensor-free rotor angle determination is no longer possible using the corresponding methods in this region. False rotor angles, which lead to erroneous driving of the synchronous machine, may therefore be determined.

The present invention is therefore based on the concept of taking this knowledge into account and providing a diagnosis for the rotor angle detection that checks whether the necessary conditions for the sensor-free rotor angle determination are complied with. If a sufficient difference between the rotor inductances in the pole axis direction and pole gap direction is not present, then the determined rotor angles have to be considered as unreliable and discarded. By contrast, if a sufficient difference between the rotor inductances in the pole axis direction and the pole gap direction is present, then the determined rotor angle may be deemed to be reliable and used to control the synchronous machine.

By checking the necessary condition for sensor-free rotor angle determination, it is possible to recognize possible rotor angle determination errors early on, and erroneous driving of the synchronous machine is able to be avoided. In particular, if the necessary conditions for reliable rotor angle determination are not present, the driving of the synchronous machine may also be modified such that the required difference is able to be produced again in the rotor inductances. The reliability of the operation of the synchronous machine is thereby able to be ensured over a wide field of use.

According to one embodiment, the step for determining the rotor angle by way of sensor-free rotor angle detection comprises applying high-frequency test voltage signals in the pole axis direction. Furthermore, the step for determining the rotor angle comprises measuring the system responses to the applied high-frequency test voltage signals and estimating an angle using the measured system responses. Sensor-free determination of the rotor angle of the synchronous machine is thereby able to be performed without a noticeable torque being applied to the synchronous machine.

According to a further embodiment, the step for determining the difference value between the rotor inductances in the pole axis direction and pole gap direction comprises applying high-frequency test voltage signals in a direction different from the pole axis direction. The step furthermore comprises measuring the system responses to the applied high-frequency signals and estimating an angle using the measured system responses. The difference value in the rotor inductances is thereby able to be determined efficiently and without an appreciable torque.

According to one embodiment, the high-frequency test voltage signals for determining the rotor angle and the high-frequency test voltage signals for determining the difference value in the rotor inductances have different operating frequencies. In particular, the operating frequency of the test signals for determining the difference value in the rotor inductances is significantly different from the operating frequency for determining the rotor angle. By way of example, the operating frequency for the sensor-free angle determination of the rotor angle may lie in the region of 1 kHz, whereas the operating frequency for determining the difference value in the rotor inductances lies in the region of approximately 10 kHz.

According to one embodiment, the method comprises a step for modifying the determined rotor angle if the amplitude of the difference between the rotor inductance of the synchronous machine in the pole axis direction and the rotor inductance of the synchronous machine in the pole gap direction lies below a predefined threshold value. By modifying the determined (estimated) rotor angle, the currents in the d-axis and q-axis direction are also modified, that is to say increased or reduced. Modifying the estimated rotor angle and therefore also the currents may in this case in particular be performed until a sufficiently large difference value between the rotor inductances of the synchronous machine in the pole axis direction and pole gap direction is created again.

According to one embodiment, in the step for discarding the established rotor angle, the rotor angle is discarded when the amplitude of the difference between the rotor inductance of the synchronous machine in the pole axis direction and the rotor inductance of the synchronous machine in the pole gap direction is smaller than a previously determined difference in the rotor inductances. A corresponding countermeasure is thereby able to be introduced immediately after a reduction in the difference between rotor inductances has been established.

The above refinements and developments may be combined with one another as desired, as long as this is expedient. Further refinements, developments and implementations of the invention also comprise combinations, not explicitly cited, of features of the invention that are described above or below with reference to the exemplary embodiments. In particular, a person skilled in the art will in this case also add individual aspects to the respective basic forms of the present invention as improvements or additions.

BRIEF DESCRIPTION OF THE DRAWINGS

The present invention is explained in more detail below on the basis of the exemplary embodiments given in schematic figures of the drawings. In the figures.

DETAILED DESCRIPTION

Figure 1:
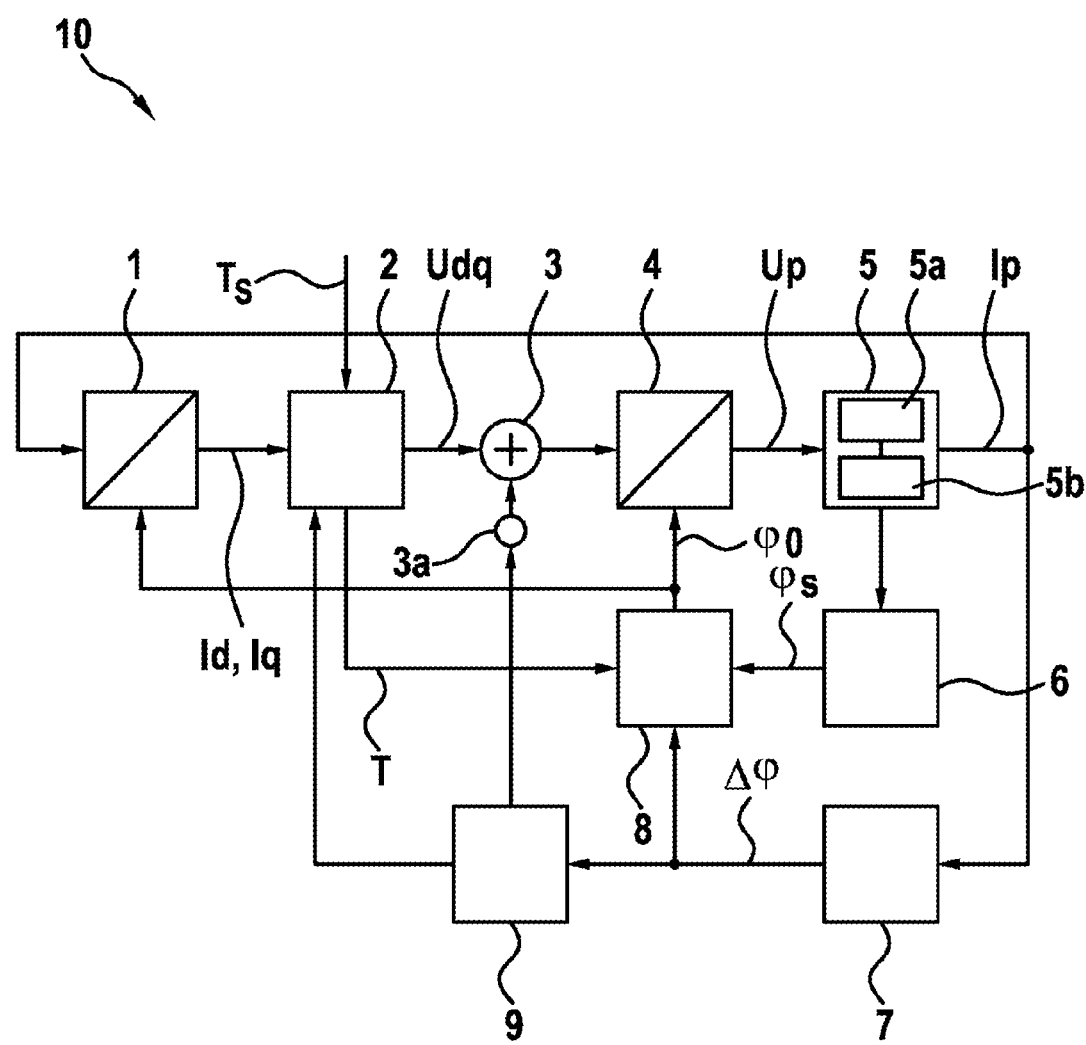
FIG. 1: shows a schematic illustration of a control system for a synchronous machine according to one embodiment.

FIG. 1 shows a schematic illustration of a control system 10 for an electric drive unit 5 having an inverter 5$a$, which feeds a synchronous machine 5$b$ with three-phase current.

The synchronous machine 5$b$ may be for example a three-phase synchronous machine. However, it is also possible in principle to provide another number of phases for the synchronous machine. In this case, the control of the synchronous machine 5$b$ in the electric drive unit 5 plays a central role. To provide a required torque using a synchronous machine 5$b$, a rotating electrical field, which rotates synchronously with the rotor, is generated in the stator of the machine. To generate this field, the current angle of the rotor is required for the control.

The control system 10 therefore comprises a control apparatus 2 that performs field-oriented control of the synchronous machine 5$b$ or of the inverter 5$a$ of the drive unit in the d-axis, q-axis coordinate system fixed to the rotor. To this end, the control apparatus 2 is fed with a setpoint torque Ts and refers to the instantaneous useful energization values Iq, Id in the d-axis, q-axis coordinate system fixed to the rotor, which values are provided by a first transformer apparatus 1. The first transformer apparatus 1 to this end measures the phase currents Ip of the synchronous machine 5$b$ and transforms the phase currents Ip into the useful energization values Iq, Id.

The control apparatus 2 outputs drive voltages Udq in the d-axis, q-axis coordinate system, fixed to the rotor, of the synchronous machine 5$b$ to a second transformer apparatus 4, which performs a corresponding transformation of the drive voltages Udq into phase drive voltages Up for the synchronous machine 5$b$. Both the first transformer apparatus 1 and the second transformer apparatus 4 refer to the time-dependent rotor angle $\varphi 0$ of the rotor of the synchronous machine 5$b$ in relation to the stator of the synchronous machine 5$b$ for the transformation. This rotor angle $\varphi 0$ is generated by an observer 8, which in turn is able to refer to a determined rotor angle $\varphi s$ of a position sensor 6 and/or to a rotor angle difference $\Delta\varphi$ that is determined by an angle estimation algorithm 7 depending on measured system responses of the synchronous machine 5$b$.

The position sensor 6 may record for example electrical operating parameters of the synchronous machine 5$b$, for example by recording the voltage at the neutral point of the synchronous machine 5$b$. The observer 8 may have for example a Kalman observer, a Luenberger observer, a Hautus observer or a Gilbert observer for assisting in and checking the plausibility of the angle observation $\varphi 0$.

To feed the angle estimation algorithm 7, a summing element 3 is provided between the control apparatus 2 and the second transformer apparatus 4, by way of which summing element 3 for example test voltage pulses ud, uq at a particular operating frequency $\omega c$ are able to be modulated up to the drive voltages Udq. These test voltage pulses ud, uq may be fed in at an input connection 3$a$ by a controller apparatus 9 that is able to counteract the observed angle difference of the angle estimation algorithm 7.

The control system 10 is likewise suitable for any other kind of sensor-free rotor angle determination method, that is to say, as an alternative to feeding in test voltage pulses ud, uq, other methods may also be used to allow system responses to be measured. By way of example, system responses may be used for rotor angle determination purposes by measuring voltages at the neutral point at suitable times using pulse width-modulated phase driving. It may also be possible to use test signal methods for rotor angle determination purposes, wherein test signals having a high operating frequency are modulated up to the drive signal. In general, any sensor-free determination method that is based on a difference between rotor inductance Ld in the pole axis direction and the rotor inductance Lq in the pole gap direction of the synchronous machine 5$b$ is suitable for feeding the angle estimation algorithm 7 for evaluating the angle difference.

The system response of the synchronous machine 5$b$ depends inter alia on the useful energization, whose value influences the difference between rotor inductance Ld in the pole axis direction and the rotor inductance Lq in the pole gap direction. The longitudinal currents Id and transverse currents Iq of a permanently excited synchronous machine behave in a manner depending on the rotor inductance Ld in the pole axis direction and the rotor inductance Lq in the pole gap direction and the applied voltage Ud or Uq, as follows:

$$dId/dt = Ld^{-1} \cdot Ud - R \cdot Ld^{-1} \cdot Id + Lq \cdot Ld^{-1} \cdot \omega e \cdot Iq$$

$$dIq/dt = Lq^{-1} \cdot Uq - R \cdot Lq^{-1} \cdot Iq + Ld \cdot Lq^{-1} \cdot \omega e \cdot Id - Lq^{-1} \cdot u\_p$$

This applies for the angular velocity ωe of the rotor of the synchronous machine 5b, the ohmic resistance R and the claw-pole rotor voltage u_p. Furthermore, it is assumed that the pole shoe or pole shoes are not operated in saturation, that is to say that the relationship between current and magnetic flux is linear and the respective inductance is not dependent on the current strength.

At a high useful energization of the synchronous machine 5b, there may however be progressive saturation of the rotor core of the synchronous machine 5b, such that the relationship between current and magnetic flux does not exhibit nonlinearity. In particular, for some 2-tuples of the useful energization Id, Iq in the coordinate system fixed to the rotor, it may be the case that the difference between rotor inductance Ld in the pole axis direction and the rotor inductance Lq in the pole gap direction disappears. Sensor-free rotor angle determination methods that depend on this inductance difference in order to obtain meaningful measured values may lose relevance at such operating points.

One exemplary such rotor angle determination method is illustrated below. To determine the angle error Δφ, the following test signal [ud, uq] is applied to the synchronous machine 5b:

$$[ud, uq] = uc \cdot \cos(\omega ct) \cdot [\cos(\Delta\varphi), \sin(\Delta\varphi)]$$

Since the electrical behavior of the synchronous machine 5b is able to be described as a purely inductive load at high frequencies, the following current vector [id, iq] is given as system response to the test signal [$u_d$, $u_q$]

$$[id, iq] = (uc/\omega c) \cdot \sin(\omega ct) \cdot [\cos(\Delta\varphi)/Ld, \sin(\Delta\varphi)/Lq]$$

To extract angle information from these currents through signal processing, the connection between the measured phase currents in the coordinate system, fixed to the stator, of the synchronous machine 5b and the currents in the coordinate system fixed to the rotor is required. Depending on the estimated d-axis direction of the synchronous machine 5b, the following is given for the currents in the coordinate system fixed to the rotor:

$$[id, iq] = uc/(4\omega cLq\,Ld) \cdot [(Lq-Ld)(\sin(\omega ct-2\Delta\varphi) + \sin(\omega ct+2\Delta\varphi)) + 2(Lq+Ld)(\sin(2\omega ct),$$

$$(Lq-Ld)(\sin(\omega ct-2\Delta\varphi) + \sin(\omega ct+2\Delta\varphi)) + 2(Lq+Ld)(\sin(2\omega ct)]$$

To extract the desired terms containing the angle difference information Δφ from the measured values of the currents [id, iq] in the coordinate system fixed to the rotor, following high-pass filtering, a convolution at the operating frequency ωc and subsequent low-pass filtering, it is possible to obtain that term that contains the angle difference information Δφ:

$$[id, iq] = u_c/(4\omega cLqLd) \cdot [(Lq-Ld)(\sin(2\Delta\varphi)), (Lq-Ld)(\cos(2\Delta\varphi)) + (Lq+Ld)]$$

As is easily able to be seen, the meaningfulness of the measured phase currents with regard to the angle difference information Δφ depends on the difference in the inductances Lq and Ld—the smaller the difference, the more inaccurate the determination of the angle difference Δφ.

To counteract this phenomenon, it is advantageous to select the operating points of the synchronous machine 5b as far as possible such that the difference in the inductances Lq and Ld remains as large as possible, that is to say that the synchronous machine 5b is not operated at saturation where possible, including at high torques.

As is able to be seen through the above embodiments, the difference Lq–Ld between the q-axis inductance (rotor inductance in the pole gap direction) and the d-axis inductance (rotor inductance in the claw-pole rotor axis direction) is decisive for determining the angle information of the rotor angle. This difference in the inductances may be determined by operating the sensor-free rotor angle detection method briefly at an angle differing from 0 degrees for diagnostic purposes. In this case, the high-frequency test voltage signal is applied and evaluation thereof is performed no longer in the d-axis direction, but rather in a direction differing from the d-axis direction. In particular, any desired number of different test angles may be used for determining the difference value in the rotor inductances. Thus, for example, n test angles may be used, having an equidistant angle spacing of 360:n degrees. By way of example, a set of test angles of 0 degrees, 15 degrees, 30 degrees, etc. may be used. Test angles of 0 degrees, 45 degrees, 90 degrees, etc. are likewise possible for example.

If the difference value between the rotor inductances of the synchronous machine 5b is diagnosed in the same way as for the sensor-free rotor angle detection, then the frequency ranges for the operating frequency of the applied test voltage pulses should have a sufficiently large spacing from one another. By way of example, the test signal for the sensor-free rotor angle determination may be implemented at a frequency of approximately 1 kHz. In this case, the test voltage signals are applied in the d-axis direction. To check the difference value in the rotor inductances, in this case for example a frequency of approximately 10 kHz may be used, the test voltage signals being applied with a varying direction differing from the d-axis direction. Synchronous sensor-free rotor angle determination and simultaneous checking of the difference value in the rotor inductances are thereby able to be performed. As an alternative, it is also possible to switch back and forth alternately between an angle determination mode for determining the rotor angle and a diagnostic mode for determining the difference value in the rotor inductances.

If, in the diagnosis of the difference value between the rotor inductances of the synchronous machine, it is established that the rotor inductance in the d-axis direction (pole axis direction) and the rotor inductance of the synchronous machine in the q-axis direction (pole gap direction) drops below a predefined threshold value (moves towards zero), then it is not possible to provide a meaningful determination of the rotor angle of the synchronous machine 5b, for the reasons described above. Therefore, in this case, the determined rotor angle is discarded and thus does not enter into the control procedure for driving the synchronous machine. Otherwise, there is the danger of the sensor-free rotor angle detection method determining an erroneous rotor angle, and this erroneous rotor angle may lead to instabilities in the driving of the synchronous machine 5b.

By contrast, if the difference value between the rotor inductances in the q-axis direction and d-axis direction lies above the predefined threshold value, then reliable sensor-free rotor angle detection is possible. In this case, the determined rotor angle may be used to drive the synchronous machine.

Figure 2:
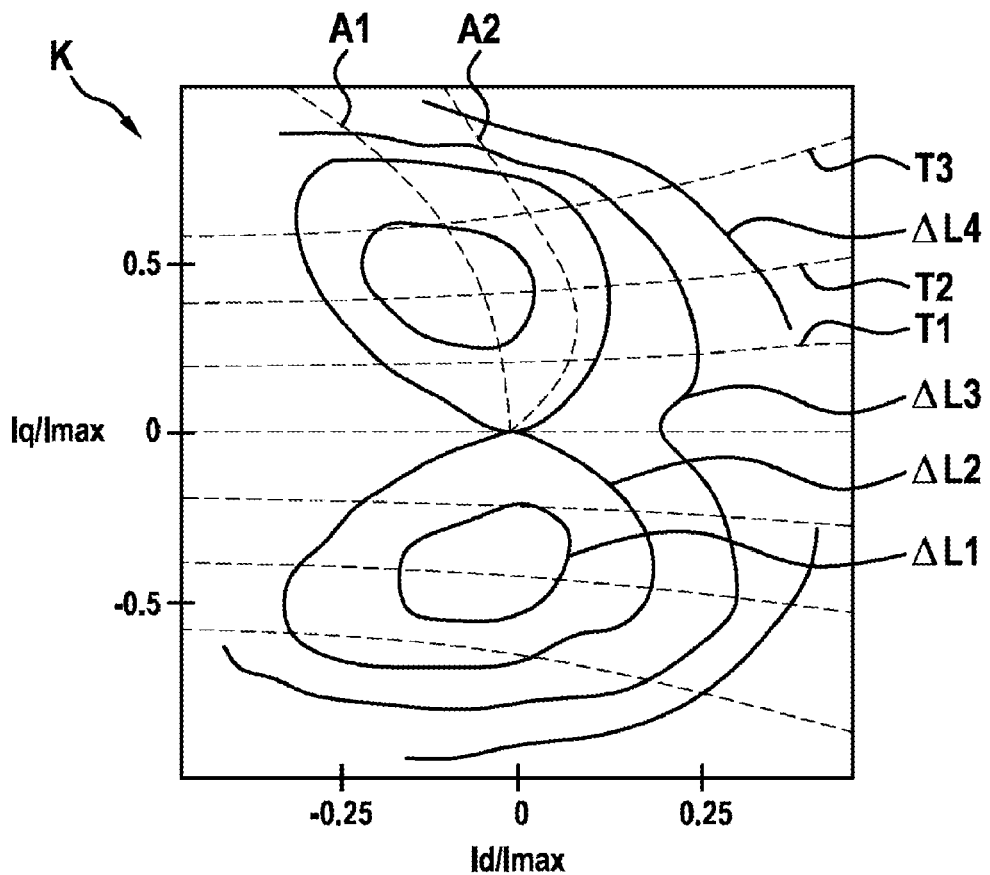
FIG. 2: shows a schematic illustration of a characteristic diagram of the dependence of the inductance difference between q-axis and d-axis inductance of a synchronous machine on the useful energization values.

FIG. 2 shows a schematic illustration of a characteristic diagram K of the dependence of the inductance difference between the d-axis and q-axis inductances of a synchronous machine on the useful energization value Id and Iq. In this characteristic diagram K, the amplitudes of the system responses from the previously described test voltage pulses are illustrated as a difference value in the inductances—for example as isobars ΔL1, ΔL2, ΔL3 and ΔL4. In this case, the isobar ΔL1 for example shows a relatively small inductance difference, whereas the isobars ΔL2 to ΔL4 each exhibit constantly increasing inductance differences. For a predefined torque, various sub-combinations of the useful energization values Id and Iq may be selected. This is indicated for example by the dashed lines T1, T2 and T3. An operating point trajectory A1 that is established using a maximum torque per ampere (MTPA) method is provided for torque-dependent operating points, for example.

However, as may be seen from the profile of the operating point trajectory A1, this runs through an operating point area having a low inductance difference, which is indicated here by the region ΔL1.

If the method described above establishes that the synchronous machine is being operated in the region ΔL1, then reliable sensor-free rotor angle determination is not possible here. Therefore, if the difference value in the rotor inductances drops below a predefined threshold value, it is possible to switch to another torque-dependent operating point trajectory, for example the operating point trajectory A2. The driving of the synchronous machine is thereby able to be stabilized by way of the information about the difference value between the rotor inductances of the synchronous machine.

Figure 3:
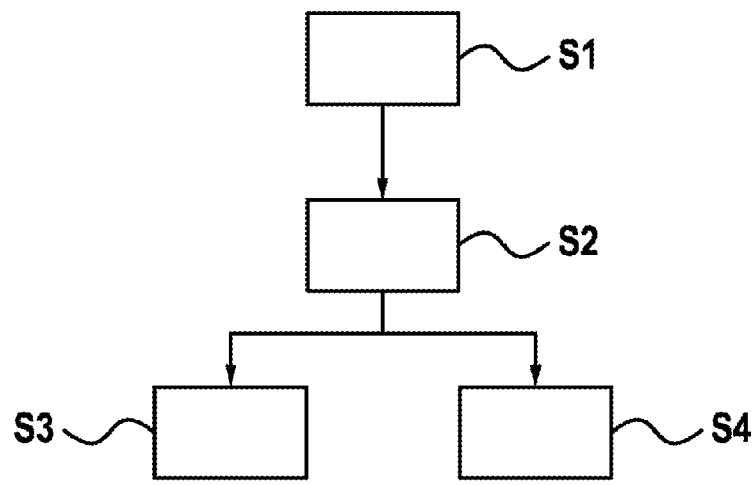
FIG. 3: shows a schematic illustration of a flowchart for a method for operating a synchronous machine according to one embodiment.

FIG. 3 shows a schematic illustration of a flowchart as underlies a method for operating a synchronous machine according to one embodiment. In step S1, a rotor angle of the synchronous machine is determined by way of a sensor-free rotor angle detection method. This may be performed for example by way of the rotor angle detection method described above.

In step S2, a difference value between the rotor inductance of the synchronous machine in the d-axis direction (pole axis direction) and a rotor inductance of the synchronous machine in the q-axis direction (pole gap direction) is determined. The difference value is determined in this case in a coordinate system (d-axis q-axis coordinate system), fixed to the rotor, of the synchronous machine. The difference value may be determined in the manner described above by applying high-frequency test voltage signals in a direction differing from the d-axis direction.

The determined difference value in the rotor inductances is then checked. If the difference value in the rotor inductances lies below a predefined threshold value, then the determined rotor angle is discarded in step S3 and does not enter into the control for driving the synchronous machine.

By contrast, if the difference value in the rotor inductances is greater than the predefined threshold value, then the determined rotor angle may be classified as reliable and enter into the driving of the synchronous machine.

As an alternative or in addition to comparing the difference value in the rotor inductances with a predefined threshold value, it is also possible to compare the determined difference value in the rotor inductance with a previously determined difference value in the rotor inductances. If it is established in the process that the difference value in the rotor inductances decreases, then this may already indicate the onset of instability in the rotor angle detection. Accordingly, in the case of a decreasing difference value in the rotor inductances, corresponding countermeasures may already be initiated in order to maintain the stability of the control for the synchronous machine.

In summary, the present invention relates to a control system and to a method for operating a synchronous machine. In particular, the synchronous machine is driven in this case on the basis of a rotor angle that was determined by way of a sensor-free rotor angle detection method. To check the reliability of the rotor angle determined in a sensor-free manner, the difference value between the rotor inductances in the q-axis direction and d-axis direction is monitored. If this difference value lies below a threshold value, then this indicates possible instabilities in the determination of the rotor angle.

The invention claimed is:

1. A method for operating a synchronous machine, the method comprising:
   determining (S1) a rotor angle of the synchronous machine via a sensor-free rotor angle detection;
   determining (S2) a difference value between a rotor inductance of the synchronous machine in a pole axis direction and a rotor inductance of the synchronous machine in a pole gap direction in a coordinate system, fixed to a rotor, of the synchronous machine;
   discarding (S3) the determined rotor angle when an amplitude of the difference value between the rotor inductance of the synchronous machine in the pole axis direction and the rotor inductance of the synchronous machine in the pole gap direction is below a predefined threshold value;
   discarding the determined rotor angle when the amplitude of the difference between the rotor inductance of the synchronous machine in the pole axis direction and the rotor inductance of the synchronous machine in the pole gap direction is smaller than a previously determined difference; and
   driving (S4) the synchronous machine using the determined rotor angle when the amplitude of the difference between the rotor inductance of the synchronous machine in the pole axis direction and the rotor inductance of the synchronous machine in the pole gap direction is greater than the predefined threshold value.

2. The method as claimed in claim 1, wherein determining the rotor angle includes applying high-frequency test voltage signals in the pole axis direction, measuring system responses to the applied high-frequency test voltage signals, and estimating an angle based on the measured system responses.

3. The method as claimed in claim 2, wherein determining the difference value includes applying high-frequency test voltage signals in a direction differing from the pole axis direction, measuring the system responses to the applied high-frequency signals, and estimating an angle using the measured system responses.

4. The method as claimed in claim 3, wherein the high-frequency test voltage signals for determining the rotor angle and the high-frequency test voltage signals for determining the difference value have different operating frequencies.

5. The method as claimed in claim 1 further comprising producing a modified determined rotor angle from the determined rotor angle when the amplitude of the difference between the rotor inductance of the synchronous machine in the pole axis direction and the rotor inductance of the synchronous machine in the pole gap direction lies below the predefined threshold value.

6. A control system (10) for a synchronous machine (5b), comprising: a control apparatus (2) configured to perform field-oriented control of the synchronous machine (*5b*) according to the method as claimed in claim 1.

* * * * *